United States Patent
Miner et al.

(10) Patent No.: US 7,798,442 B2
(45) Date of Patent: Sep. 21, 2010

(54) ROTOR ASSEMBLIES HAVING AUTOMATIC BLADE FOLDING SYSTEMS

(75) Inventors: Frederick J. Miner, Barkhamsted, CT (US); Frank P. D'Anna, Seymour, CT (US); David N. Schmaling, Southbury, CT (US); Michael R. Robbins, Guilford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 11/378,608

(22) Filed: Mar. 17, 2006

(65) Prior Publication Data

US 2007/0215749 A1    Sep. 20, 2007

(51) Int. Cl.
*B64C 27/50* (2006.01)

(52) U.S. Cl. .................... 244/17.27; 416/143; 416/103; 416/141; 244/17.11

(58) Field of Classification Search .............. 244/17.11, 244/17.27; 416/142, 143, 103, 141, 140, 416/134 A
See application file for complete search history.

(56) References Cited

U.S. PATENT DOCUMENTS

| | | | | |
|---|---|---|---|---|
| 3,101,785 A | * | 8/1963 | Leoni | 416/143 |
| 4,028,001 A | * | 6/1977 | Watson | 416/134 A |
| 4,268,222 A | | 5/1981 | Bernard | 416/1 |
| 4,284,387 A | * | 8/1981 | Ferris | 416/134 A |
| 4,436,483 A | * | 3/1984 | Watson | 416/143 |
| 5,322,415 A | | 6/1994 | White et al. | 416/143 |
| 5,628,620 A | | 5/1997 | Arlton | 416/114 |
| 5,782,606 A | | 7/1998 | Mondet et al. | 416/142 |
| 6,032,899 A | | 3/2000 | Mondet et al. | 244/17.25 |
| 6,036,442 A | | 3/2000 | Certain et al. | 416/143 |
| 6,047,924 A | | 4/2000 | Thomassin et al. | 244/49 |
| 6,447,249 B2 | * | 9/2002 | Potdevin | 416/143 |
| 6,695,253 B1 | | 2/2004 | Romani et al. | 244/6 |
| 6,752,596 B2 | * | 6/2004 | Mondet et al. | 416/95 |
| 6,783,327 B1 | * | 8/2004 | Davis | 416/1 |

* cited by examiner

*Primary Examiner*—Benjamin P Lee
(74) *Attorney, Agent, or Firm*—Ohlandt, Greeley, Ruggiero & Perle, L.L.P.

(57) ABSTRACT

A rotor assembly having a rotor hub, a plurality of yokes, and a plurality of swing arms is provided. The yoke depending from the rotor hub. Each swing arm is movably positioned on the rotor hub for rotation between an unlocked position and a locked position. The yokes are freely movable about a pitch axis and a lead/lag axis when the swing arms are in the unlocked position and the yokes are locked in a predetermined pitch position and a predetermined lead/lag position when the swing arms are in the locked position.

23 Claims, 12 Drawing Sheets

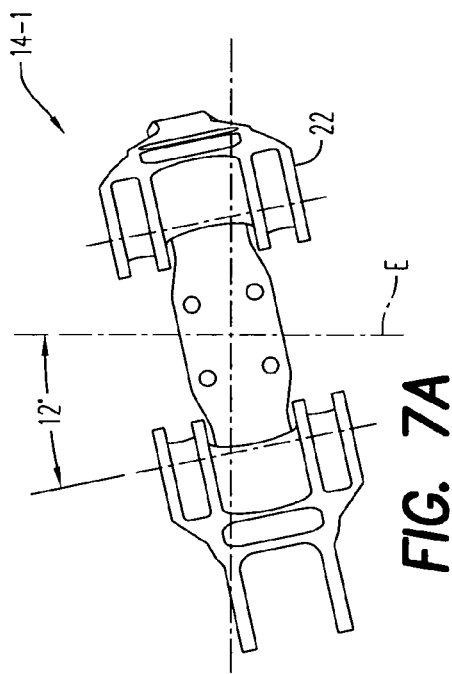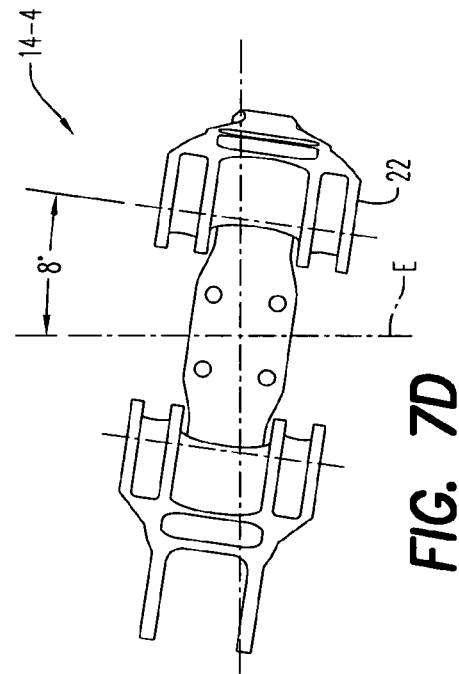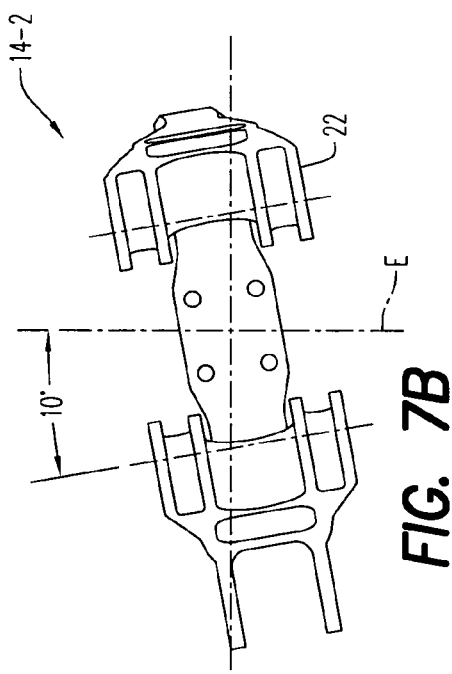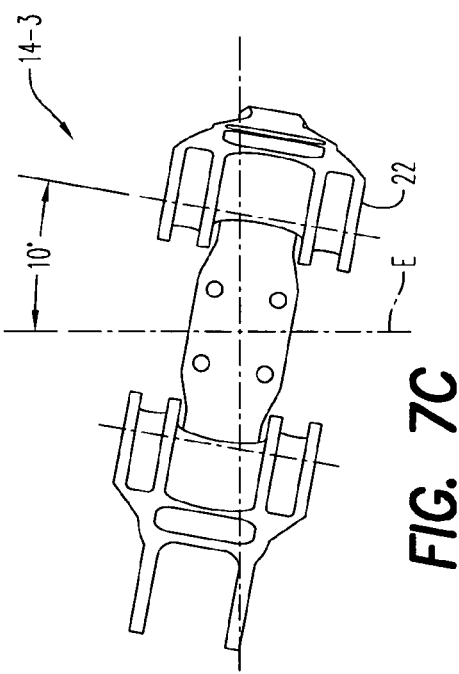

ROTOR ASSEMBLIES HAVING AUTOMATIC BLADE FOLDING SYSTEMS

BACKGROUND OF THE INVENTION

1. Field of the Invention

The present disclosure relates to rotorcraft. More specifically, the present disclosure relates to rotor assemblies having automatic blade folding systems.

2. Description of Related Art

Rotorcraft such as, but not limited to, helicopters include a plurality of rotor blades that are used to generate the lift and effectuate the primary flight control of the craft. When the rotorcraft is not in use, it can be desired to move or fold the blades of the rotorcraft to a non-flight position. In such a non-flight position, the span of the blades can be moved to a position over the body of the craft to reduce the footprint of the rotorcraft.

Many manual and automatic blade folding systems have been proposed. Some prior systems require large hydraulic pressure cylinders mounted within the main rotor shaft to drive all rotor blades to the full lead position. Unfortunately, the large hydraulic pressure cylinders add undesired weight to the rotorcraft. Further, driving the rotor blades to the full lead position can place undesired strain on various elastomeric bearings, which can reduce the service life of such bearings. Moreover, the large hydraulic pressure cylinders systems require continuous pressurization, which has proven to be prone to leakage.

In order to overcome the strain placed on the elastomeric bearings some prior systems have included a pitch restraint system. These pitch restraint systems prevent the blade from dropping to the ground during the fold by reacting the torsional loads generated during the fold cycle. One prior pitch restraint system requires hydraulically or mechanically locking a plurality of control servos for each blade after driving all of the rotor blades to the full lead position. Unfortunately, these systems again add undesired weight and have not proven effective at reducing the loads on the elastomeric bearings.

Accordingly, there is a need for automatic blade folding systems and rotorcraft having such systems that overcome one or more of the aforementioned and other deleterious effects of the prior art blade folding systems.

BRIEF SUMMARY OF THE INVENTION

These and other objects of the present disclosure are provided by a rotor assembly having a rotor hub, a plurality of yokes, and a plurality of swing arms. The yoke depending from the rotor hub. Each swing arm is movably positioned on the rotor hub for rotation between an unlocked position and a locked position. The yokes are freely movable about a pitch axis and a lead/lag axis when the swing arms are in the unlocked position and the yokes are locked in a predetermined pitch position and a predetermined lead/lag position when the swing arms are in the locked position.

These and other objects of the present disclosure are also provided by a rotor assembly having a rotor hub, a yoke, a swing arm, a blade hinge, and a locking pin. The yoke depends from the rotor hub and the swing arm is movably positioned on the rotor hub for rotation between an unlocked position and a locked position. The yoke is freely movable about a pitch axis and a lead/lag axis when the swing arm is in the unlocked position and the yoke is locked in a predetermined pitch position and a predetermined lead/lag position when the swing arm is in the locked position. The blade hinge is secured to the yoke for movement about a fold axis between a flight position and a non-flight position. The locking pin is moveable between an extended position and a retracted position. The blade hinge is moveable between the flight and non-flight positions when the locking pin is in the retracted position and the blade hinge is secured in the flight position when the locking pin is in the extended position.

A method for folding a blade of a rotorcraft is also provided. The method includes moving a swing arm on a rotor hub from an unlocked position to a locked position so that the swing arm moves a yoke depending from the rotor hub to a predetermined lead/lag position. The method also includes engaging a pin on the swing arm with a lug on the rotor hub when the swing arm is in the locked position to lock the yoke in the predetermined lead/lag and pitch positions.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIGS. 7A through 7D illustrate end views of a pitch lock position for each blade in the rotor assembly of FIG. 4;

DETAILED DESCRIPTION OF THE INVENTION

Figure 1:
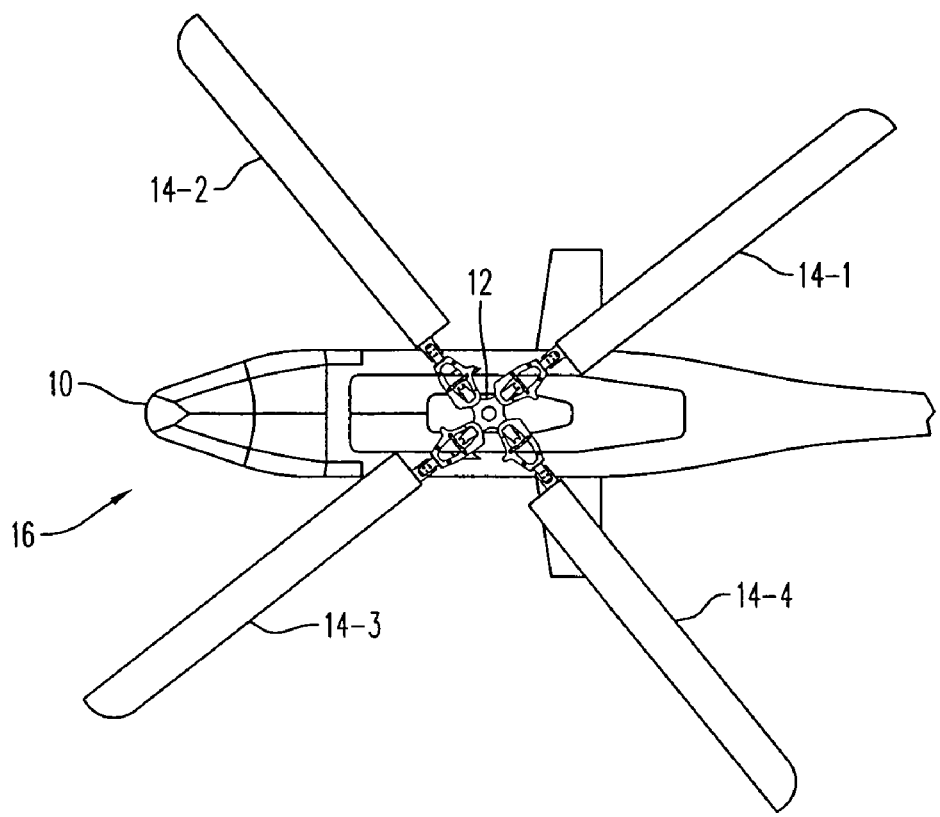
FIG. 1 is a schematic top view of a rotorcraft according to the present disclosure in a first or flight condition.
Figure 2:
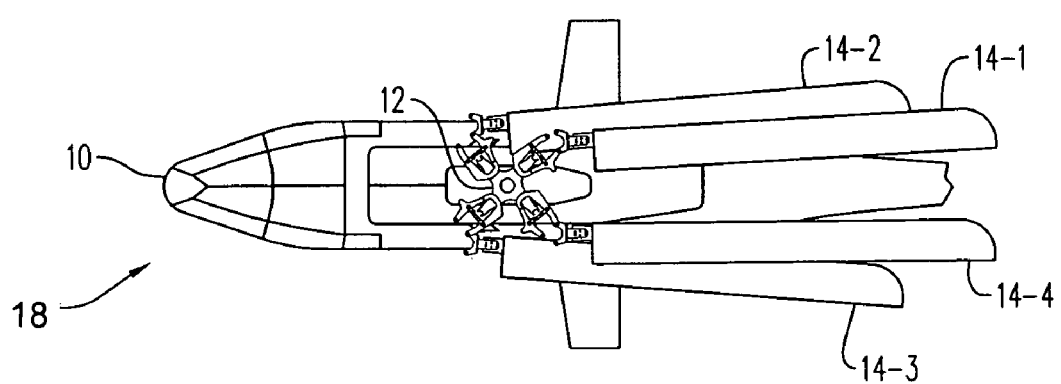
FIG. 2 is a schematic top view of the rotorcraft of FIG. 1 in a second or non-flight condition.

FIGS. 1 and 2 schematically illustrate an exemplary embodiment of a rotorcraft 10 including an automatic blade folding system according to the present disclosure. Rotorcraft 10 includes a rotor assembly 12 and two or more rotor blades 14 (four shown). Advantageously, rotor assembly 12 is configured to automatically move blades 14 between a flight position 16 (FIG. 1) and a non-flight position 18 (FIG. 2).

Figure 3:
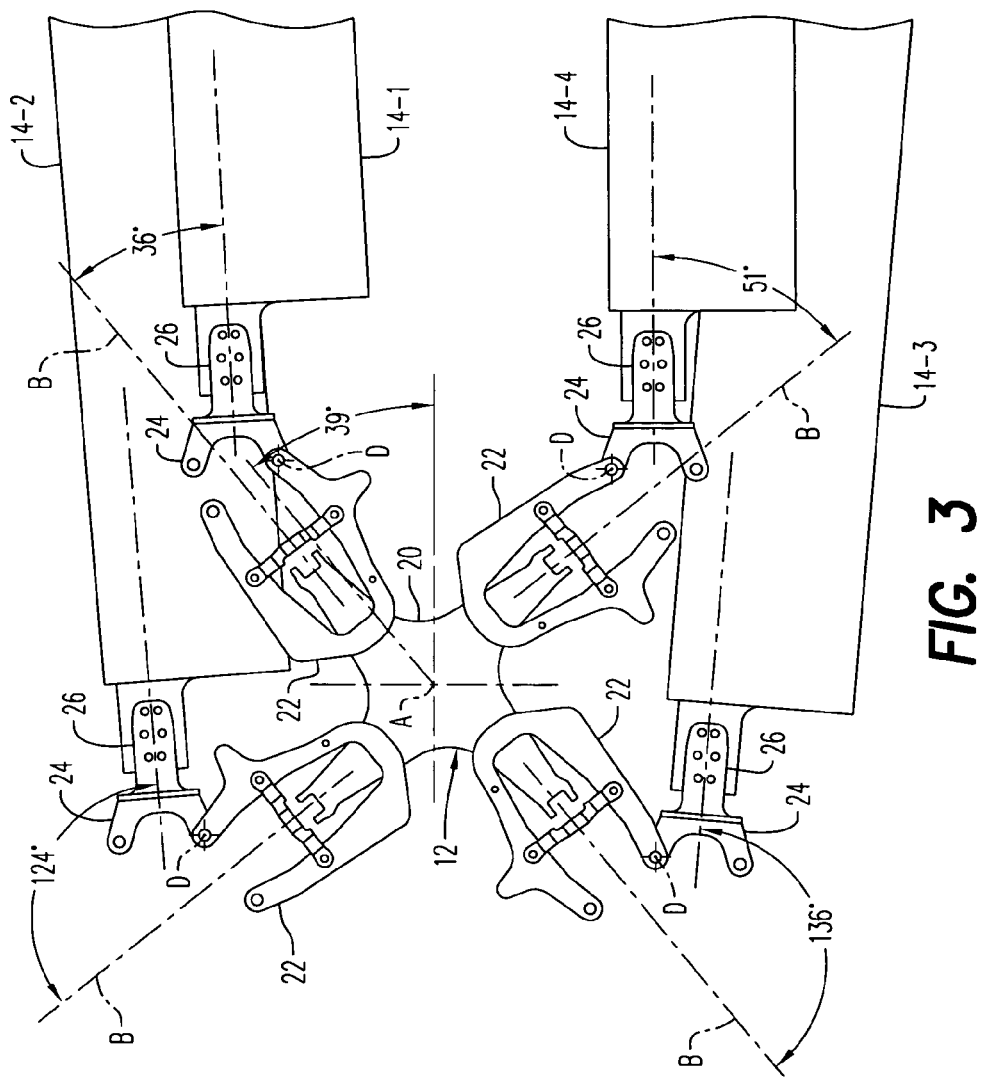
FIG. 3 is a top view of an exemplary embodiment of a rotor assembly according to the present disclosure in the second or non-flight condition.
Figure 4:
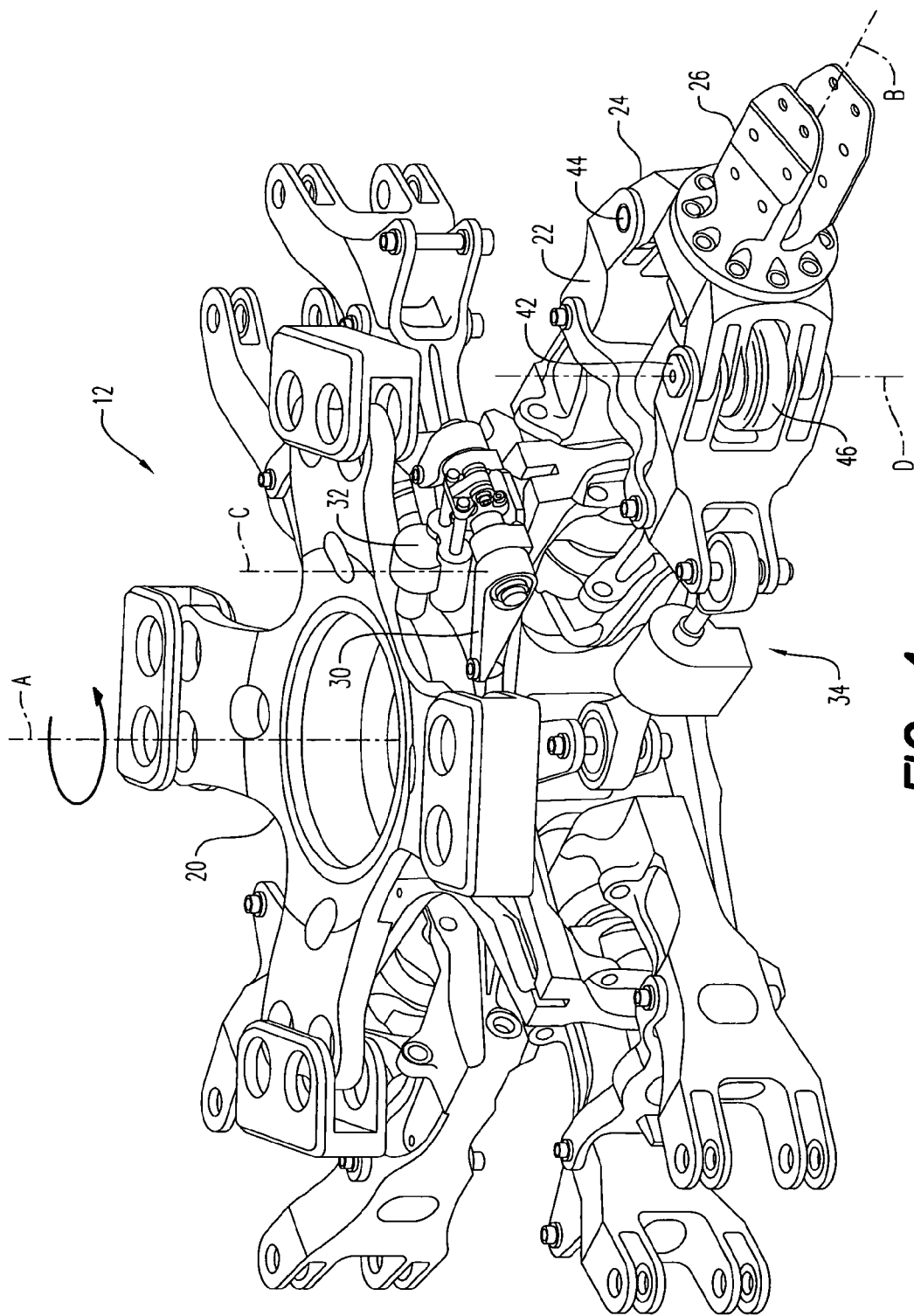
FIG. 4 is a top perspective view of the rotor assembly of FIG. 3, having various components omitted for clarity.

As seen in FIGS. 3 and 4, rotor assembly 12 includes a rotor hub 20 and a plurality of yokes 22. Each yoke 22 is secured to one blade 14 by a blade hinge 24 and a blade cuff 26. Rotor assembly 12 is configured for primary flight control in a known manner. Specifically, rotor assembly 12 is configured to rotate rotor hub 20 about an axis A, to pivot each yoke 22 about a pitch axis B, to pivot each yoke 22 about a flap axis, and to pivot each yoke 22 about a lead/lag axis C. In addition, rotor assembly 12 includes a swashplate (not shown) configured to move vertically along axis A and tilt in any direction, imparting pitch motion to each yoke 22 about pitch axis B. Thus, rotor assembly 12 is configured to provide primary flight control to rotorcraft 10 in a known manner.

Advantageously, blade hinge 24 is secured to yoke 22 for pivotal movement about a fold axis D to move blades 14 between flight and non-flight positions 16, 18.

Figure 5A:
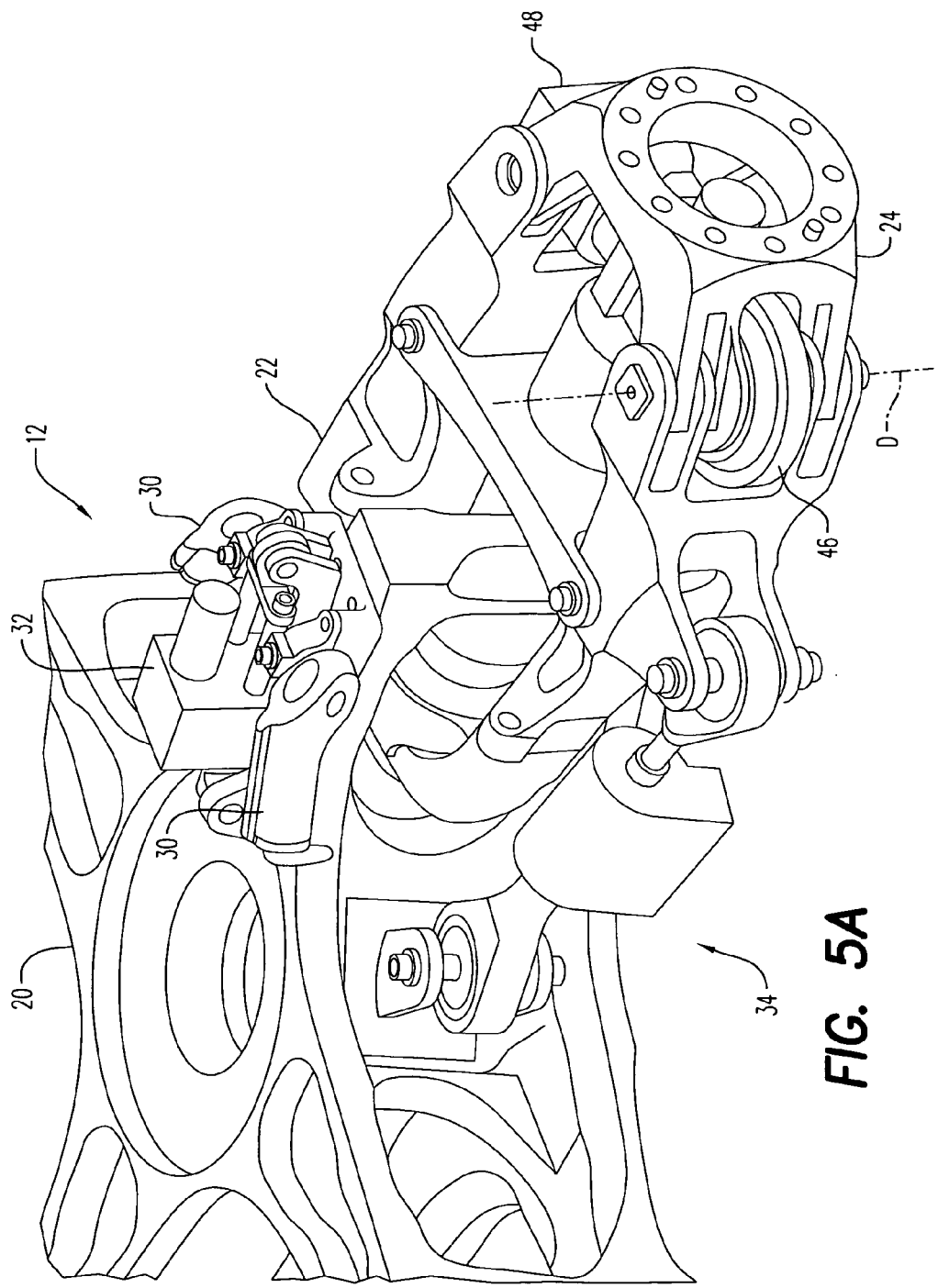
FIG. 5A is an outboard view of the rotor assembly of FIG. 4 illustrating an exemplary embodiment of a pitch lock in an unlocked or flight position.
Figure 5B:
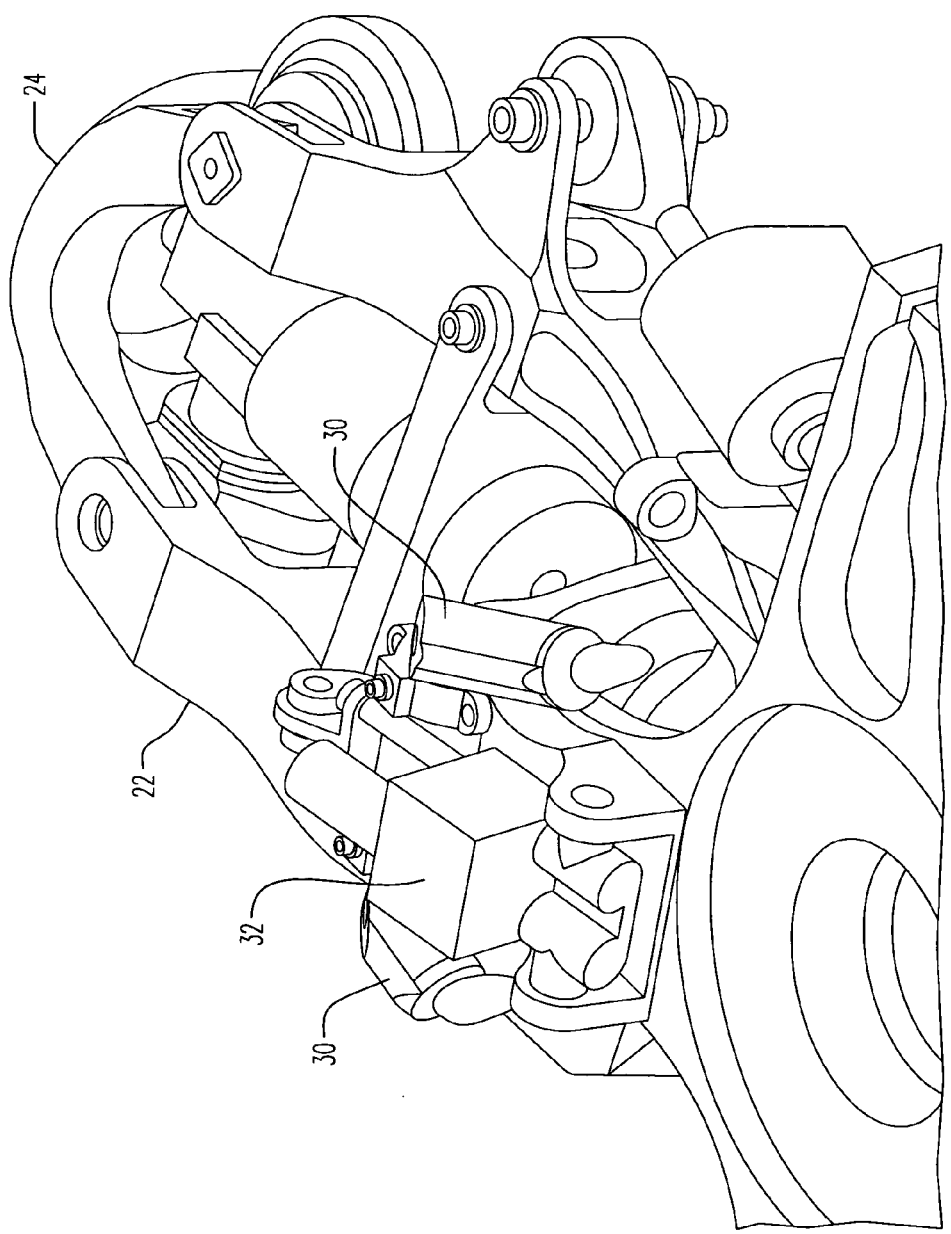
FIG. 5B is an inboard view of the rotor assembly of FIG. 5A.
Figure 6A:
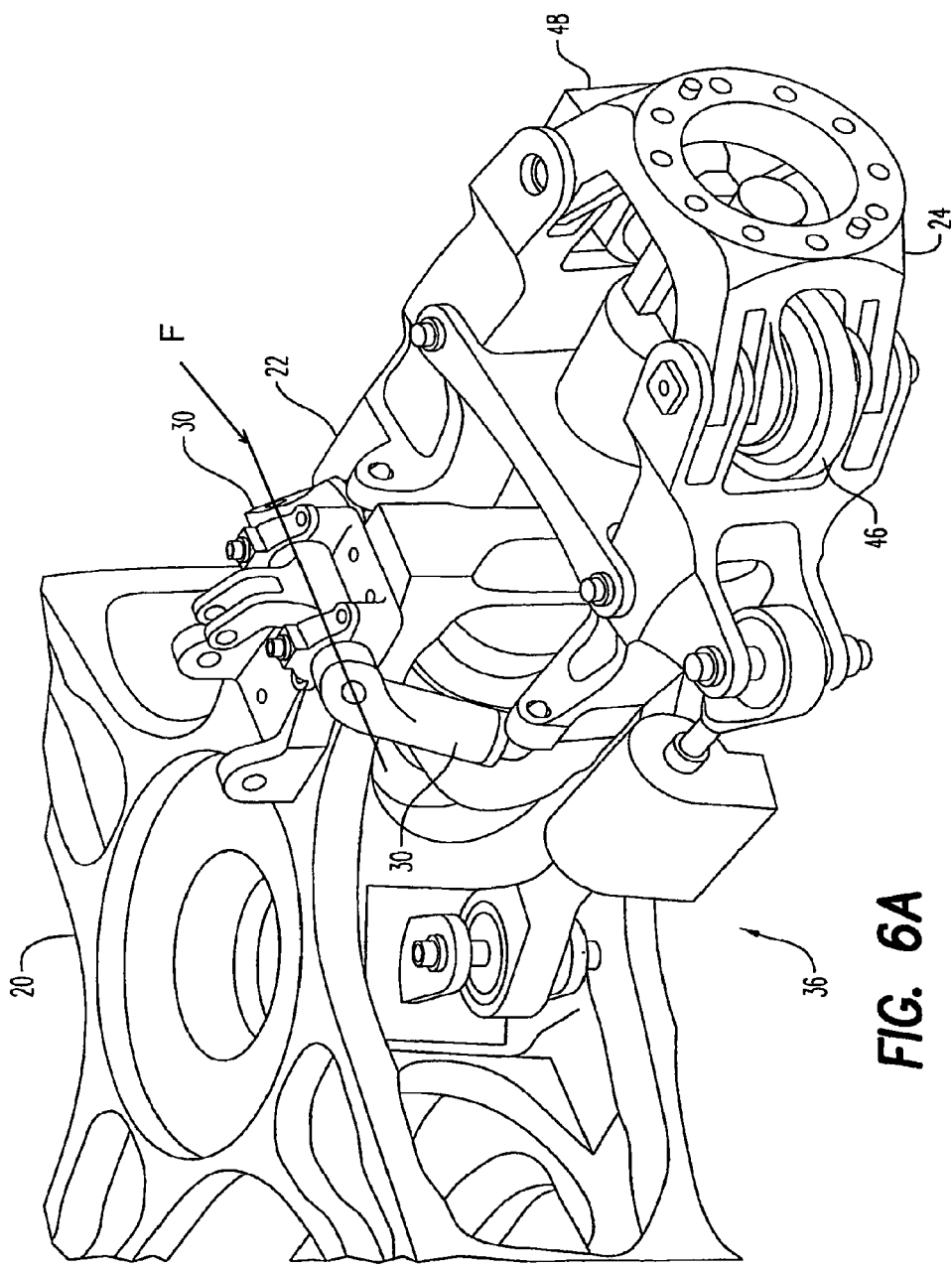
FIG. 6A is an outboard view of the rotor assembly of FIG. 4 having the pitch lock in a locked or non-flight position.
Figure 6B:
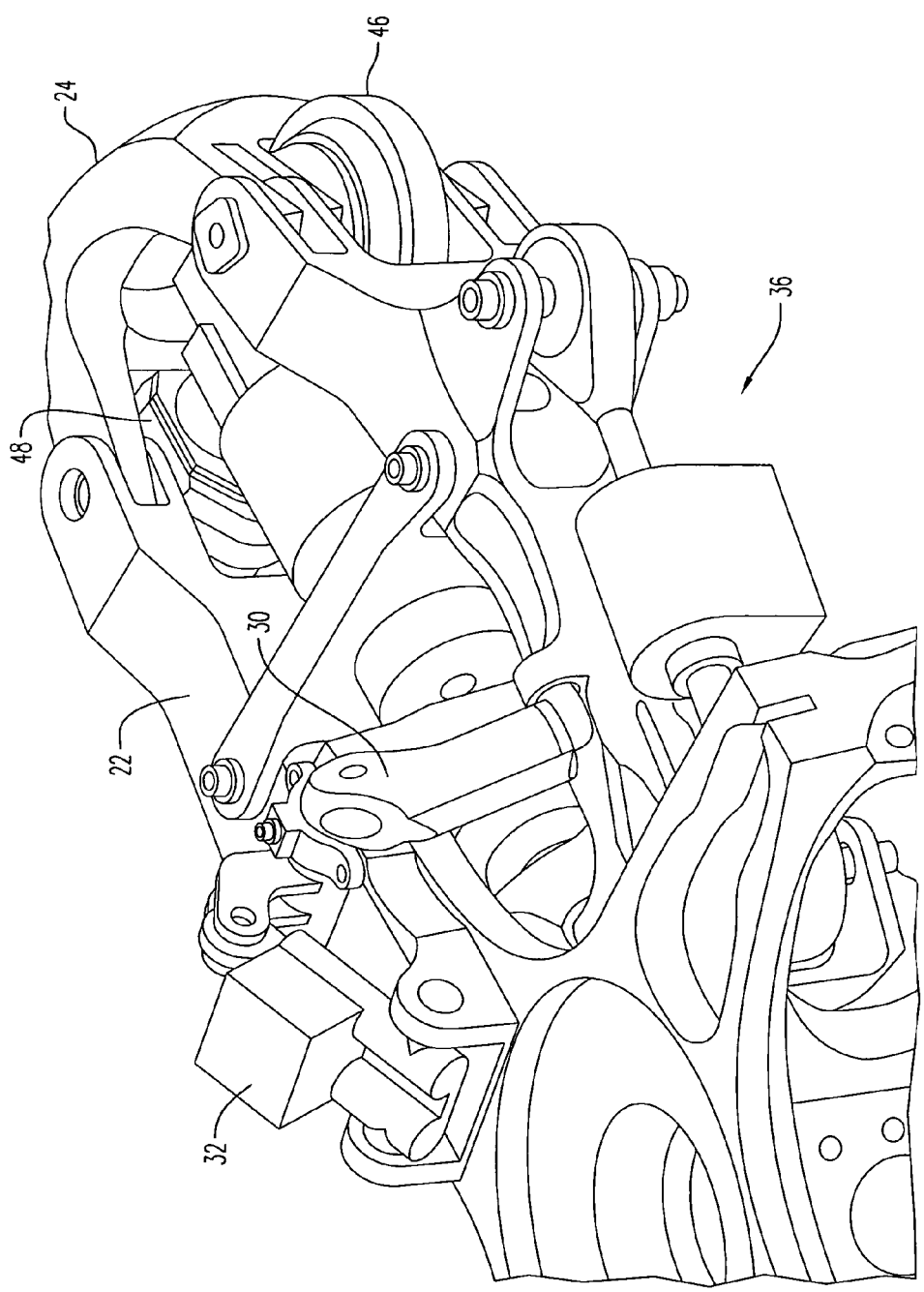
FIG. 6B is an inboard view of the rotor assembly of FIG. 6A.
Figure 6C:
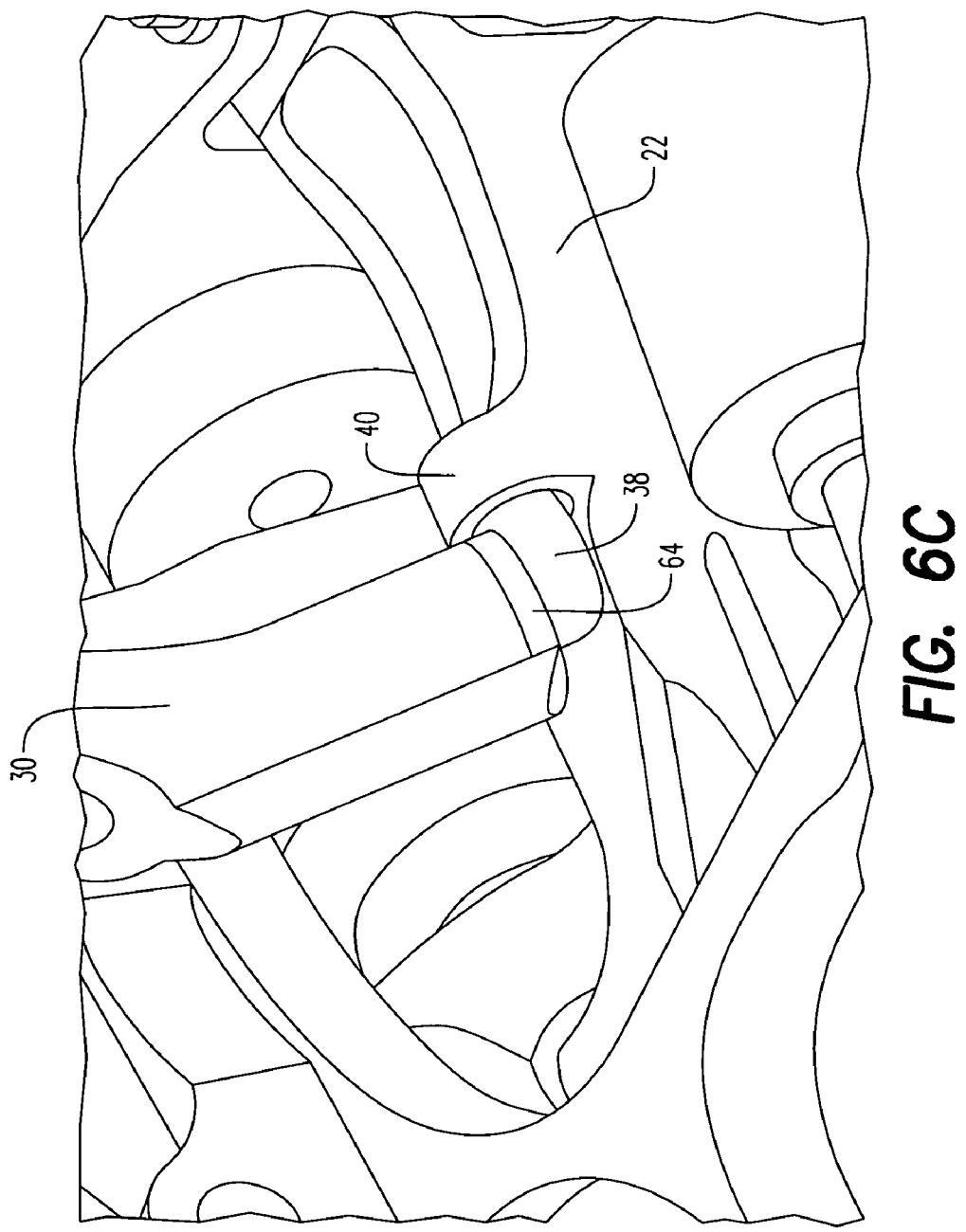
FIG. 6C is a close up inboard view of the rotor assembly of FIG. 6B.

The automatic folding system of rotor assembly 12 is described with simultaneous reference to FIGS. 4, 5, and 6. Rotor assembly 12 includes a swing arm 30 and an actuator 32.

Swing arm 30 is movably positioned on hub 20 for movement by actuator 32 between a first or unlocked position 34 (FIGS. 4 and 5) and a second or locked position 36 (FIG. 6). Preferably, swing arm 30 is a pair of swing arms that are cast as one member. Of course, it is contemplated by the present disclosure for swing arm 30 to have any desired unitary or assembly form.

With swing arm 30 in unlocked position 34, yoke 22 can be freely moved by rotor assembly 12 about pitch axis B and lead/lag axis C. However, yoke 22 is moved to and locked in a selected position with respect to pitch axis B and lead/lag axis C when swing arm 30 is moved about a swing arm axis F (FIG. 6A) to locked position 36. Specifically, swing arm 30 includes a locking pin 38 that mates with a locking lug 40 of yoke 22 as the actuator moves the swing arm to locked position 36.

Swing arm 30 is configured such that pin 38 and lug 40 move yoke 22 to a predetermined lead/lag position (i.e., rotate the yoke about axis C) and lock the yoke 22 in this predetermined lead/lag position. Preferably, swing arm 30 is configured to move and lock yoke 22 to a neutral lead/lag position. Of course, it is contemplated by the present disclosure for swing arm 30 is configured to move and lock yoke 22 to any desired lead/lag position.

Additionally, swing arm 30 is configured such that pin 38 and lug 40 lock the yoke 22 in a predetermined pitch position (after the swashplate has positioned the yoke to the predetermined pitch position). An exemplary embodiment of the predetermined pitch position for each blade 14 in rotor assembly 12 is shown is FIG. 7. Rotor system 12 can include swing arms (not shown in FIG. 7 for purposes of clarity) that are configured to lock the yoke 22 of each blade 14-1, 14-2, 14-3, 14-4 to a unique pitch position so that the blades are in a position conducive for folding.

For example, the swing arm at blade 14-1 can be configured to lock blade 14-1 to a predetermined pitch position of about negative twelve degrees from a vertical axis E as shown in FIG. 7A, where the vertical axis E is parallel to axis A. The swing arm at blade 14-2 can be configured to lock blade 14-2 to a predetermined pitch position of about negative ten degrees from vertical axis E as shown in FIG. 7B. The swing arm at blade 14-3 can be configured to lock blade 14-3 to a predetermined pitch position of about positive ten degrees from vertical axis E as shown in FIG. 7C. The swing arm at blade 14-4 can be configured to lock blade 14-4 to a predetermined pitch position of about positive eight degrees from vertical axis E as shown in FIG. 7D. In this manner, blades 14 are properly positioned for folding.

The angle at which the yoke 22 is locked may vary due to adjustment of the control rod (not shown) that positions the yoke in the pitch direction. This adjustment is common on helicopters. If the control rods are adjusted to different lengths, a compensating adjustment must be made to the pitch lock. Advantageously, this adjustment can be easily accomplished by the combination of the present disclosure by simply adding or removing spacers (not shown) from a location 64 between swing arm 30 and pin 38.

Advantageously, rotor assembly 12 having swing arm 30 in locked position 36 provides for both lead/lag positioning and restraint, as well as a dual pitch lock arrangement that unloads sensitive components of the rotor assembly 12 during folding of blades 14. In addition, rotor assembly 12 provides for these advantageous benefits with only a single actuator 32 per blade 14. Moreover, rotor assembly 12 provides for these benefits with a higher commonality of parts from blade-to-blade than previously possible.

It has been determined by the present disclosure that rotor assembly 12 can be provided with the aforementioned automatic folding system with an increased uniformity of parts than previously possible. For example, it has been determined that rotor assembly 12 can be provided with the aforementioned automatic folding system simply by varying the length of swing arm 30 at each blade 14. Thus, each blade 14 of rotor assembly 12 includes identical yokes 22, blade hinges 24, blade cuff 26, and actuators 32, where swing arm 30 is the only component of the rotor assembly that is different from blade-to-blade.

Once blades 14 are locked in the predetermined pitch position, the blades can be folded without imparting undesired strain or forces (in lead-lag direction) on the components of rotor assembly 12. The folding of blades 14 is described with reference to FIGS. 3, 4 and 8. Rotor assembly 12 includes a hinge pin 42, a locking pin 44, a folding actuator 46, and a locking pin puller 48. Hinge pin 42 secures blade hinge 24 to yoke 22 for movement about fold axis D.

Figure 8:
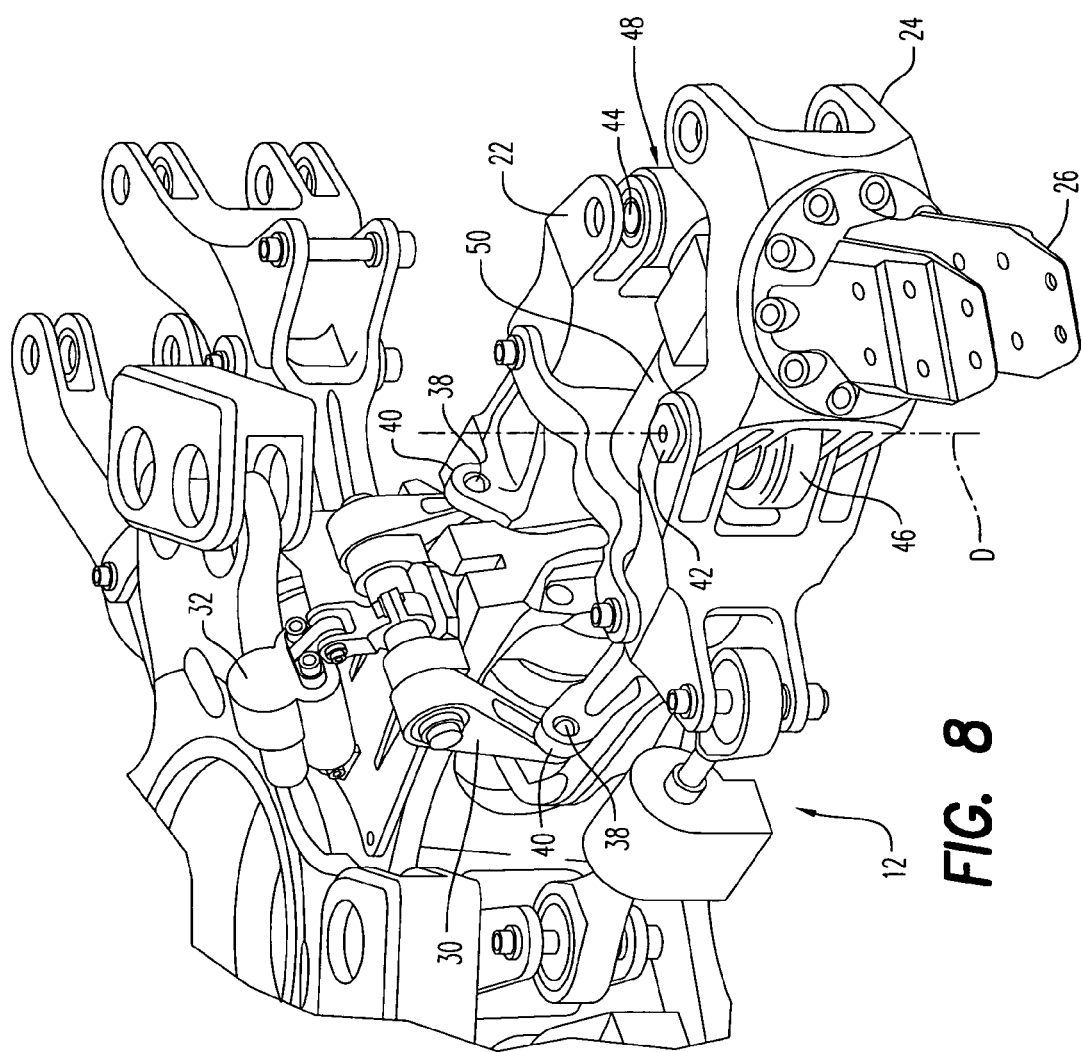
FIG. 8 is a view of the rotor assembly of FIG. 6 having the blade rotated to the second or non-flight position.

Locking pin puller 48 is configured to move locking pin 44 between an extended or locked position shown in FIG. 4 and a retracted or unlocked position shown in FIG. 8. Once locking pin 44 is moved to the unlocked position, folding actuator 46 is configured to move blade hinge 24 about fold axis D between a flight position shown in FIG. 4 and a folded position shown in FIG. 8.

Each folding actuator 46 can be controlled to vary the fold angle of each blade 14 as shown in FIG. 3. For example, folding actuator 46 at blade 14-1 can move blade hinge 24 by about negative 36 degrees, folding actuator 46 at blade 14-2 can move blade hinge 24 about axis D by about negative 124 degrees, folding actuator 46 at blade 14-3 can move blade hinge 24 about axis D by about positive 136 degrees, and folding actuator 46 at blade 14-4 can move blade hinge 24 by about positive 51 degrees.

Figure 9:
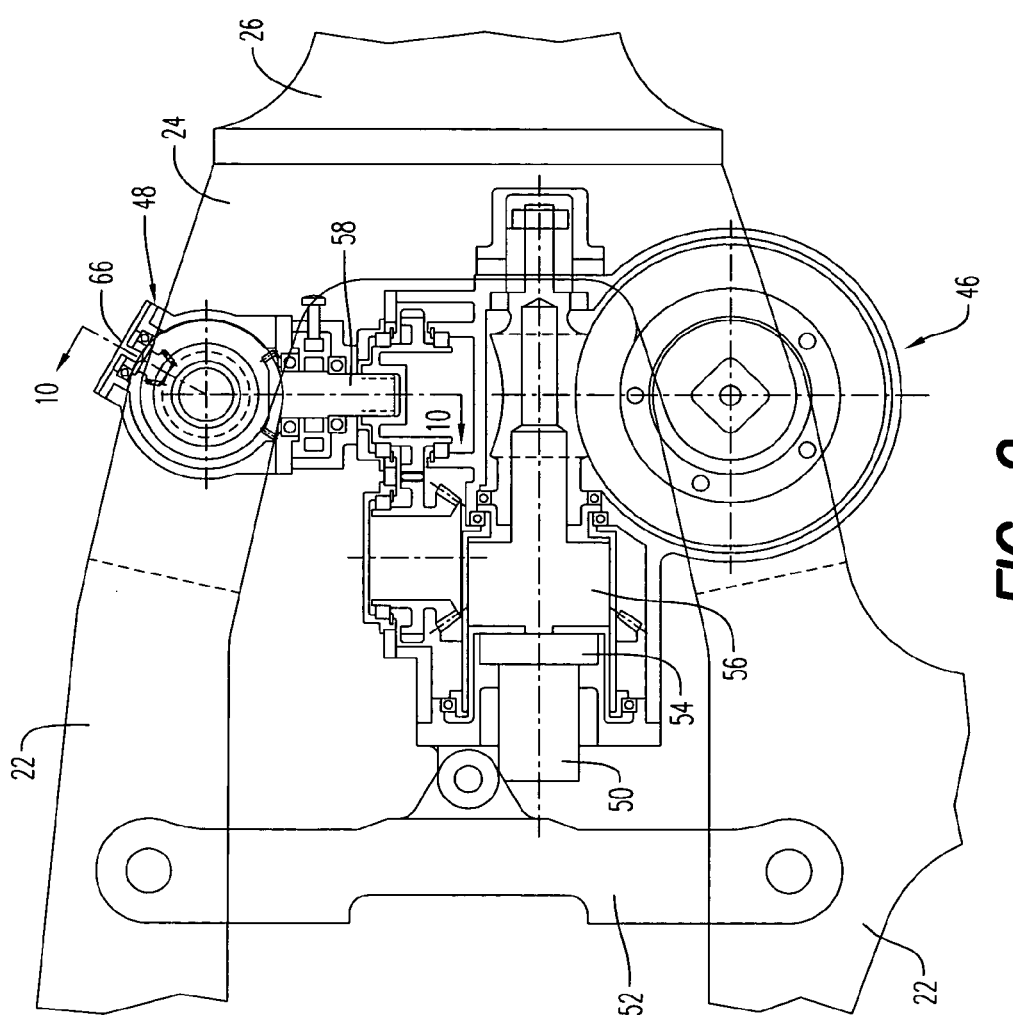
FIG. 9 is a top view of an exemplary embodiment of a locking pin puller and a folding actuator according to the present disclosure.
Figure 10:
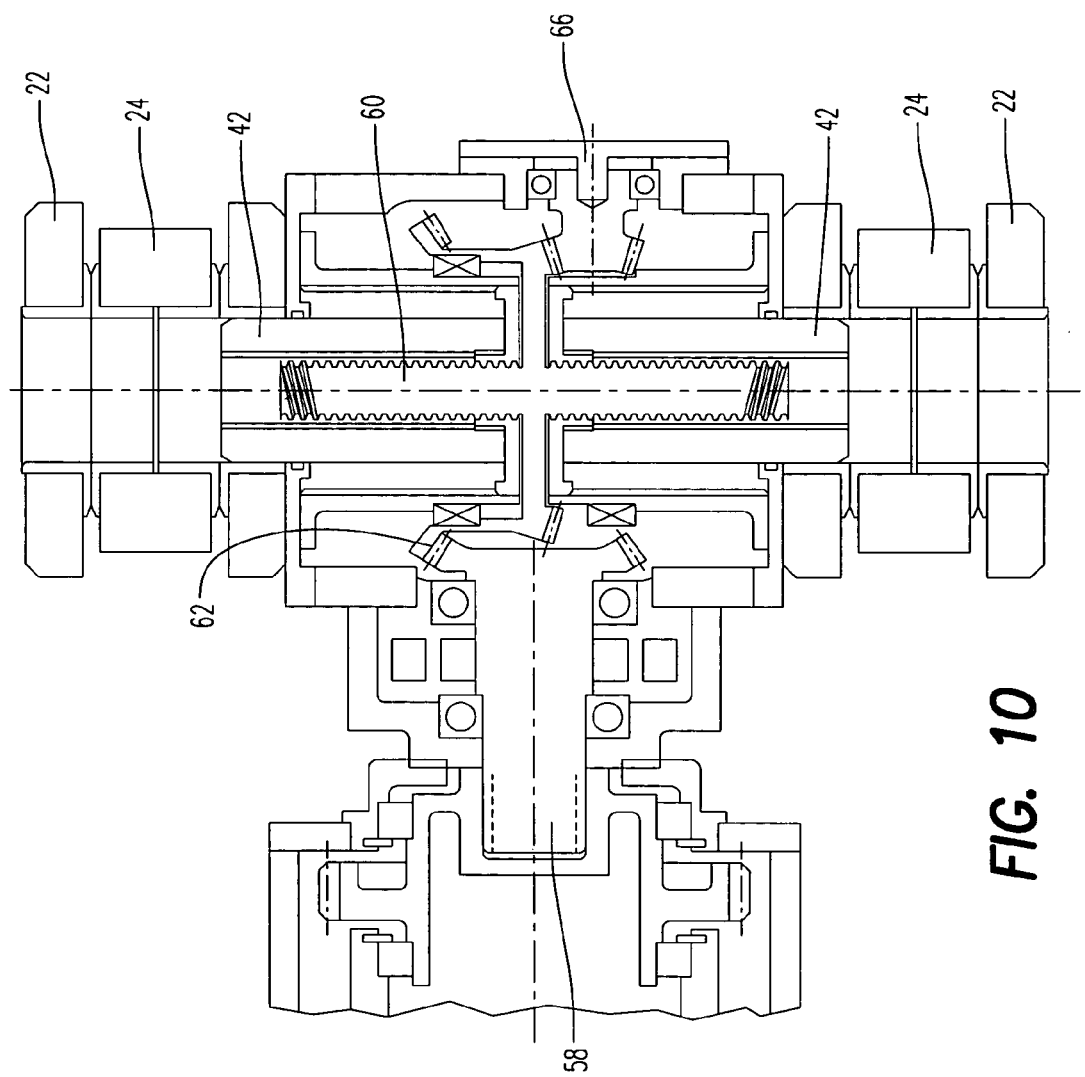
FIG. 10 is a sectional view of FIG. 9, taken along lines 10-10.

An exemplary embodiment of folding actuator 46 and locking pin puller 48 are described with reference to FIGS. 9 and 10. Actuators 46, 48 can be driven by a single motor 50 secured to yoke 22 at a droop stop bracket 52. Preferably, motor 50 is an electric motor.

Motor 50 is operatively coupled via a magnetic brake 54 to a planetary gear train 56. Gear train 56 is engaged with folding actuator 46 to move blade hinge 24 about axis D as described above. In this manner, rotation of motor 50 can be transmitted to folding actuator 46 to move hinge 24 between the flight position and the folded position.

Gear train 56 is also engaged with an output shaft 58. Locking pin 44 includes an internal screw shaft 60, which is engaged with output shaft 58 at a pair of mated bevel gears 62. In this manner, rotation of motor 50 can also be transferred to locking pin puller 48 to move locking pin 44 between the extended position (not shown) and the retracted of FIG. 10.

In the event that motor 50 fails and/or a loss of power to the motor, folding actuator 46 and locking pin puller 48 can be driven by a single manual override 66. Manual override 66 accepts a square drive or any other torque-transmitting device (not shown) for movement of gear train 56 in the absence of a driving force from motor 50. The manual override 66 may be positioned at other locations of the gear train as required to optimize torque and number of turns required to complete the fold operation.

Planetary gear train 56 is arranged such that two outputs can be obtained. When one output is locked, the torque is automatically directed to the other output. In this manner, during the fold sequence, for example, initially the fold gear side is locked since the pins are engaged. So, the torque is diverted to the pin puller side, driving the pins out first. Once the pins are fully retracted, the torque is diverted to the fold side, which is now free to rotate.

The operation of the automatic folding system of rotor assembly 12 will now be described with reference to FIG. 8. First, the swashplate is positioned such that the plurality of yokes 22 are in their respective predetermined pitch position. Next, actuator 32 is activated to move swing arms 30.

The operation of the automatic folding system of rotor assembly 12 for folding blades 14 from the flight position to the non-flight position will now be described with reference to FIGS. 4 and 8.

Next, actuator 32 is activated to move swing arms 30 from unlocked position 34 (FIG. 4) to locked position 36 (FIG. 8) so that pin 38 mates with lug 40 of yoke 22. As swing arm 30 moves to locked position 36, the swing arm moves all of the yokes 22 to a neutral lead/lag position and locks the yoke of each blade 14 in the predetermined pitch position for that blade.

Rotor assembly 12 then activates motor 50 to move locking pins 44 from the extended position (FIG. 4) to the retracted position (FIG. 8). Once locking pins 44 are in the retracted position, motor 50 causes folding actuator 46 to move blade hinge 24 about axis D to the non-flight position.

The operation of the automatic folding system of rotor assembly 12 can simply be reversed to return blades 14 from the non-flight position back to the flight position.

Advantageously, rotor assembly 12 provides an automatic blade folding system that replaces the heavy and leak prone hydraulic systems of the prior art with a simple set of actuators. Moreover, rotor assembly 12 provides an automatic blade folding system that limits stress on the components of the system by only forcing the blades to the neutral lead/lag position and by unloading the bearings with a dual pitch lock arrangement during folding of the blades.

The terms "first", "second", "primary", "secondary", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The inventioned claimed is:

1. A rotor assembly comprising:
   a rotor hub configured to rotate about a rotor hub axis;
   a plurality of yokes depending from said rotor hub; and
   a plurality of swing arms corresponding in number to said plurality of yokes, each of said plurality of swing arms being movably positioned on the rotor hub for rotation about a swing arm axis between an unlocked position and a locked position, said plurality of yokes being freely movable about a pitch axis and a lead/lag axis when said plurality of swing arms are in said unlocked position and said plurality of yokes being locked in a predetermined pitch position and a predetermined lead/lag position when said plurality of swing arms are in said locked position, wherein said swing arm axis is perpendicular to said rotor hub axis.

2. The rotor assembly of claim 1, further comprising a plurality of blade hinges corresponding in number to said plurality of yokes, each of said plurality of blade hinges being secured to a respective one of said plurality of yokes for movement about a fold axis between a flight position and a non-flight position.

3. The rotor assembly of claim 2, further comprising a rotor blade secured to each of said plurality of blade hinges by a blade cuff.

4. The rotor assembly of claim 2, further comprising a locking pin at each of said plurality of blade hinges, said locking pin being moveable between an extended position and a retracted position, said plurality of blade hinges being moveable between said flight and non-flight positions when said locking pins are in said retracted position and said plurality of blade hinges being secured in said flight position when said locking pins are in said extended position.

5. The rotor assembly of claim 2, further comprising a distance between said swing arm axis and said rotor hub axis is smaller than a distance between said fold axis and said rotor hub axis.

6. The rotor assembly of claim 2, wherein said swing arm axis remains fixed with respect to said rotor hub axis during movement about said folding axis.

7. The rotor assembly of claim 1, wherein each of said plurality of swing arms comprise a locking pin that mates with a locking lug of said plurality of yokes when said plurality of swing arms are in said locked position.

8. The rotor assembly of claim 1, wherein said plurality of swing arms are configured to move said plurality of yokes to said predetermined lead/lag position as said plurality of swing arms are moved from said unlocked position to said locked position.

9. The rotor assembly of claim 8, wherein said predetermined lead/lag position is a neutral lead/lag position.

10. The rotor assembly of claim 1, wherein said predetermined pitch position for each of said plurality of yokes is different.

11. The rotor assembly of claim 10, wherein said plurality of swing arms are different from blade-to-blade.

12. The rotor assembly of claim 1, wherein each of said plurality of swing arms comprises a pair of swing arms.

13. A rotor assembly comprising:
    a rotor hub that rotates about a rotor hub axis;
    a yoke depending from said rotor hub; and
    a swing arm movably positioned on the rotor hub for rotation about a swing arm axis between an unlocked position and a locked position, said yoke being freely movable about a pitch axis and a lead/lag axis when said swing arm is in said unlocked position and said yoke being locked in a predetermined pitch position and a predetermined lead/lag position when said swing arm is in said locked position, wherein said swing arm axis is perpendicular to said rotor hub axis.

14. The rotor assembly of claim 13, further comprising a blade hinge secured to said yoke for movement about a fold axis between a flight position and a non-flight position.

15. The rotor assembly of claim 14, further comprising a locking pin being moveable between an extended position and a retracted position, said blade hinge being moveable between said flight and non-flight positions when said locking pin is in said retracted position and said blade hinge being secured in said flight position when said locking pin is in said extended position.

16. The rotor assembly of claim 15, further comprising a motor for moving said blade hinge between said flight and non-flight positions and said locking pin between said extended and retracted positions.

17. The rotor assembly of claim 13, wherein swing arm comprises a pair of swing arms each having a locking pin that mates with a locking lug of said yokes when said swing arm is in said locked position.

18. The rotor assembly of claim 13, wherein said swing arm is configured to move said yoke to said predetermined lead/lag position as said swing arm is moved from said unlocked position to said locked position.

19. A method for folding a blade of a rotorcraft, comprising:

moving a swing arm on a rotor hub, which rotates about a rotor hub axis, from an unlocked position to a locked position so that said swing arm moves about a swing arm axis that is perpendicular to the rotor hub axis and moves a yoke depending from the rotor hub to a predetermined lead/lag position; and engaging a pin on said swing arm with a lug on said yoke when said swing arm is in said locked position to lock said yoke in said predetermined lead/lag position and to lock said yoke in a predetermined pitch position.

20. The method of claim 19, further comprising moving a locking pin from an extended position to a retracted position so that a blade hinge secured to the blade is pivotable on said yoke about a hinge pin.

21. The method of claim 20, further comprising pivoting said blade hinge on said yoke to fold the blade.

22. The method of claim 19, wherein said predetermined lead/lag position is a neutral lead/lag position.

23. The method of claim 19, further comprising adding or removing spacers between swing arm and said pin.

* * * * *